US007925048B2

(12) United States Patent
Kinoshita

(10) Patent No.: US 7,925,048 B2
(45) Date of Patent: Apr. 12, 2011

(54) FEATURE POINT DETECTING DEVICE, FEATURE POINT DETECTING METHOD, AND FEATURE POINT DETECTING PROGRAM

(75) Inventor: Koichi Kinoshita, Kyoto (JP)

(73) Assignee: Omron Corporation, Kyoto (JP)

( * ) Notice: Subject to any disclaimer, the term of this patent is extended or adjusted under 35 U.S.C. 154(b) by 1064 days.

(21) Appl. No.: 11/717,139

(22) Filed: Mar. 13, 2007

(65) Prior Publication Data

US 2007/0217683 A1    Sep. 20, 2007

(30) Foreign Application Priority Data

Mar. 13, 2006    (JP) .................................. 2006-068047

(51) Int. Cl.
  *G06K 9/00*    (2006.01)
(52) U.S. Cl. ........ 382/103; 382/118; 382/154; 345/419; 348/169
(58) Field of Classification Search .................. 382/103, 382/118, 154, 285, 286, 291; 345/419–427; 348/42–60, 169
See application file for complete search history.

(56) References Cited

U.S. PATENT DOCUMENTS

| | | | | |
|---|---|---|---|---|
| 5,995,639 | A * | 11/1999 | Kado et al. ..................... | 382/118 |
| 2006/0269143 | A1* | 11/2006 | Kozakaya ..................... | 382/218 |
| 2007/0031028 | A1* | 2/2007 | Vetter et al. ..................... | 382/154 |
| 2007/0183665 | A1* | 8/2007 | Yuasa et al. ..................... | 382/195 |
| 2007/0201729 | A1* | 8/2007 | Yuasa et al. ..................... | 382/118 |
| 2007/0217683 | A1* | 9/2007 | Kinoshita ..................... | 382/190 |
| 2007/0258645 | A1* | 11/2007 | Gokturk et al. ............... | 382/190 |
| 2008/0130961 | A1* | 6/2008 | Kinoshita ..................... | 382/118 |
| 2008/0192990 | A1* | 8/2008 | Kozakaya ..................... | 382/117 |
| 2008/0219501 | A1* | 9/2008 | Matsumoto ................... | 382/103 |

FOREIGN PATENT DOCUMENTS

| | | |
|---|---|---|
| EP | 1 811 456 A1 | 7/2007 |
| JP | 09-251534 | 9/1997 |
| JP | 2000-97676 | 4/2000 |
| JP | 2003-514309 | 4/2003 |
| JP | 2003-141551 | 5/2003 |

OTHER PUBLICATIONS

A. Lanits, C.J. Taylor, T.F. Cootes, Automatic Interpretation and Coding of Face Images Using Flexible Models, IEEE PAMI vol. 19, No. 7, pp. 743-756, Jul. 1997.
T.F. Cootes, G.J. Edwards and C.J. Taylor, "Active Appearance Models," IEEE PAMI, vol. 23, No. 6, pp. 681-685, 2001.
Baker, S. et al., "Real-Time Non-Rigid Driver Head Tracking for Driver Mental State Estimation" 11TH World Congress on Intelligent Transportation Systems, pp. 1-18, 2004.

(Continued)

*Primary Examiner* — Aaron W Carter
(74) *Attorney, Agent, or Firm* — Dickstein Shapiro LLP

(57) ABSTRACT

A device and method for detecting feature points of an object from an image. A three-dimensional model is created in which a plurality of nodes corresponding to feature points in a learning image are defined. The model is projected onto an input image and a feature value is derived from a plurality of sampling points around a projection point of each node. An error estimated amount is computed based on the displacement of a feature point between a correct model and an error model. The three dimensional position of each feature point in the input image is estimated based on the error estimated amount and a three dimensional model.

16 Claims, 7 Drawing Sheets

OTHER PUBLICATIONS

Xiao, J. et al., "Real-Time Combined 2D+3D Active Appearance Models" Proceedings of the 2004 IEEE Computer Society Conference on Computer Vision and Pattern Recognition Washington, D.C., USA, vol. 2, pp. 535-542, Jun. 27, 2004.

Ahlberg, J. et al., "Face Tracking for Model-Based Coding and Face Animation" International Journal of imaging Systems and Technology, vol. 13, No. 1, pp. 8-22, 2003.

Ahlberg, J. et al., Chapter 4, Parametric Face Modeling and Tracking, Handbook of Face Recognition, pp. 65-87, Jan. 1, 2005.

Donner, R. et al., "Fast Active Appearance Model Search Using Canonical Correlation Analysis" IEEE Transactions on Pattern Analysis and Machine Intelligence, vol. 28, No. 10, pp. 1690-1694, Oct. 1, 2006.

Smeraldi, F. et al., "Retinal Vision Applied to Facial Features Detection and Face Authentication" Pattern Recognition Letters, Elsevier, vol. 23, No. 4, pp. 463-475, Feb. 1, 2002.

* cited by examiner

# FEATURE POINT DETECTING DEVICE, FEATURE POINT DETECTING METHOD, AND FEATURE POINT DETECTING PROGRAM This application claims priority to Japanese Application No. 068047/2006, which is hereby incorporated by reference.

BACKGROUND OF THE RELATED ART

1. Field of the Related Art

The present invention relates to a technique that is effective when applied to a device, a method or a program, etc., for detecting feature points of an object from an image.

2. Description of the Related Art

A technique for detecting the feature points of the object from the image includes a technique of detecting the feature points of a face. The related art for when the object is a face will be described below.

The closing and opening information of the eye, face orientation, viewing direction, facial expression, etc. of a person can be estimated by obtaining the positions of the feature points of the face from the image in which the person is imaged. In addition, the state of the person can be understood in more detail from the estimation result. Further, the performance of a man-machine interface may be enhanced and a new service may be provided by understanding the state of the person in detail. Therefore, it is important to accurately learn the positions of the feature points of the face in developing the man-machine interface.

A driver monitoring system is an example of the man-machine interface. In this system, the opening and closing of the eye, the face orientation, the viewing direction, etc. of the driver are observed. Then, appropriate advice is given based on the degree of fatigue, etc. of the driver determined from the observation result.

Furthermore, application to moving picture video camera, still image camera etc. are other examples of the man-machine interface. In these devices, various processes such as changing the photographing conditions become possible by learning the face orientation of the person to be photographed. Moreover, an individual can be identified with high precision by analyzing in detail the image of the feature points such as the eye, the mouth, etc.

Generally, a method of obtaining the positions of the feature points from the image (hereinafter referred to as "feature point detecting method") is a method that employs template matching, and the application thereof. In such method, the general information (hereinafter referred to as "feature value") of each feature point is stored in advance. Then, the feature value obtained from one region of the image and the stored feature value are compared and a determination is made as to whether or not the feature point obtained is the feature point to be acquired. A specific example of the feature value used in this case is a luminance value vector of the image. In addition, means for comparing the feature values generally include using normal correlation or Euclidean distance.

A technique for reducing the number of search points in advance by means of a separation degree filter, and thereafter detecting the feature point candidates through pattern matching has been proposed (refer to Japanese Laid-Open Patent Publication No. 9-251534) as an example of feature point detecting technique. In this technique, geometrical restraining conditions are applied after the feature point candidates are detected and the combination of candidate points determined most likely to look like a human face is output.

In this technique, however, only the feature points of the image of a person, who is facing more or less to the front, under satisfactory photographing conditions can be detected. Therefore, the feature points are difficult to accurately detect from an image in which some of the feature points are hidden by an object or from an image in which the photographing conditions (for example, the lighting conditions) greatly differ from the time of acquiring the feature points that were stored in advance.

Techniques for estimating the face orientation by obtaining the positions of the feature points of the face have also been proposed (refer to Japanese Laid-Open Patent Publication No. 2000-97676 and Japanese Laid-Open Patent Publication No. 2003-141551). In these techniques, the method of acquiring the positions of the feature points of the face, and thereafter making an estimation using the entire arrangement and the feature value thereof is generally known. For example, the relationship between the coordinates of the feature points indicating the eye, the mouth, the eyebrow, and the nose, and the face orientation is stored in advance as a look-up table. Then, the face orientation corresponding to the coordinates of the feature points acquired from the image is determined from the look-up table, and output as an estimation result. Other methods of obtaining the face orientation include a method of preparing a template of the entire face or of the feature values of the face in correspondence to a plurality of directions of the face, and performing a match with the template. In such methods as well, however, whether or not the estimation of the face orientation can be accurately performed depends on the accuracy of the positions of the feature points of the face. Therefore, the estimation of the face orientation cannot be accurately performed unless the positions of the feature points of the face are accurately acquired.

A technique referred to as ASM (Active Shape Model) (refer to, for example, A. Lanitis, C. J. Taylor, T. F. Cootes, "Automatic Interpretation and Coding of Face Images Using Flexible Models. IEEE PAMI Vol. 19, No. 7 pp. 743-756, July, 1997) is known as a technique for solving the above problems. In ASM, the positions of the feature points are acquired in advance for a great number of training face images, and the face shape model is created and stored. The face shape model is configured by nodes corresponding to each feature point. The details of the face shape model will be described later.

The process of detecting the position of the feature point from the image by ASM will now be described. First, the face shape model is arranged at an appropriate initial position of the image to be processed. Next, a plurality of feature values around the node is acquired for each node of the face shape model. The acquired plurality of feature values and the feature values associated with the relevant node in advance are then compared. Each node is moved to a position where the feature value closest to the feature value corresponding to each node is acquired (i.e., the position at which the possibility of being the feature point corresponding to each node is the highest) out of the positions at which the plurality of feature values are acquired. At this point, the position of each node of the face shape model is displaced from the initial position. Consequently, the deformed node set is shaped by projecting it onto the face shape model. The processes after acquiring the feature value around each node are repeatedly performed a predetermined number of times or until a constant condition (restraining condition) is met. The final position of each node is then determined as the position of each feature point.

In ASM, projection onto the face shape model is performed after the position of each node is moved. According to this process, the accurate position of the feature point can be detected with the positional relationship of each node maintaining a face-like shape. In other words, even if by chance a portion having a feature value similar to a feature point exists at a position not acceptable in forming the shape of the face of a normal person, such a point is prevented from being mistakenly detected as the feature point.

However, a search (acquisition of feature value and comparison thereof of the peripheral region must be performed at each node in conventional ASM. Thus, a large amount of calculation time is required. Moreover, conventional ASM has a drawback in that the robustness is low. In other words, if the direction of the face in the image to be processed differs greatly from the direction of the face assumed in the face shape model arranged at the initial position, the detection of the feature points tends to fail.

AAM (Active Appearance Model) is a technique proposed for solving the problems of ASM (refer to T. F. Cootes, G. J. Edwards and C. J. Taylor. "Active Appearance Models", IEEE PAMI, Vol. 23, No. 6, pp. 681-685, 2001). In AMM, the position of a feature point is obtained in the following manner. First, the positions of the feature points are acquired for a large number of training face images, and a face shape model is created, similar to ASM. Next, a mean value for all relevant feature points among the large number training face images is determined for each feature point in the face shape model. Subsequently, an average shape model is constructed from the set of feature points that are closest to the previously calculated mean values. Feature points are taken from the learning face images to create a plurality of patches; each patch is projected onto the mean shape model, and a shape free image is created (this process is referred to as the "shape correcting process"). In order to remove changes to the node position influenced by facial expression, facial direction, and various idiosyncrasies of an individual's face, etc, found in an image, the node position is fitted onto the mean shape model thus resulting in the shape free image in which only luminance value information remains. A patch is a plane formed from a plurality of nodes or feature points at its vertices. A face luminance value model (shape free face luminance value model) is created by performing main component analysis on a set of shape free images. Subsequently, starting from the correct position, the face shape model is minutely displace by a constant amount in each to obtain a shape free luminance value vector. Linear regression is performed on the relevant set of vectors. Thus, it is possible to estimate the amount and direction needed to move and/or deform a point in the minutely displaced face luminance value vector to obtain a correct point in the face shape model. The above-described processes are executed in advance as learning processes in AMM.

The process of detecting the position of the feature point from the image using AMM will now be described. First, the face shape model is arranged at an appropriate initial position of the image to be processed. Next, a patch is then created based on the node position of the arranged face shape model, and the luminance distribution in each patch is sampled. Then, the shape free face luminance value model is created by projecting the sampled luminance distribution onto the image.

The amount of movement and deformity of the face shape model is estimated from the shape free face luminance value model by a regression expression obtained in advance. The face shape model is moved and deformed according to the estimation result. The above processes are repeatedly executed a predetermined number of times or until a constant condition (restraining condition) is met. The final position of each node is then determined to be position of each feature point.

According to AAM, the position of each feature point is detected without performing a search of the peripheral region of each node. Thus, time is not required for a search of the peripheral region of each node, as opposed to ASM, and the calculation time can be reduced. Moreover, the accurate position of the feature point can be detected with the positional relationship of each node maintaining a face-like shape, similar to ASM, since the search is performed by deforming the shape model.

SUMMARY

The first aspect of the present invention relates to a feature point detecting device for estimating a three dimensional position of a plurality of feature points in an image of a predetermined object from an input image. The object herein may be any object as long as a shape model can be set. For example, the object may be a face of a person, whole (entire body) person, or organs in, for example, an X-ray or CT (Computed Tomography) image. In other words, the present technique is applicable to objects having individual difference in size or objects that deform without changing the basic shape thereof.

The feature point detecting device according to the first aspect of the present invention includes a model creating means, a projecting means that projects each node defined by the three dimensional model onto the input image, a feature value acquiring means, a storing means, an error estimated amount acquiring means, and an estimating means. The model creating means creates a three dimensional model in which the three dimensional position of a plurality of nodes each corresponding to the plurality of feature points is defined.

The feature value acquiring means acquires the feature value as a node feature value of each node of the three dimensional model from a plurality of sampling points around the projection point of each node projected by the projecting means. Examples of the feature value include luminance value of the pixel, the Sobel filter feature value, the Harr Wavelet feature value, the Gabor Wavelet feature value, and the composite value thereof. Furthermore, the arrangement of sampling points may be non-homogeneous and of low density.

The storing means stores in advance information on a correlation of a difference between a correct model, in which the plurality of nodes are each three dimensionally arranged at correct positions of the corresponding feature points, and an error model, in which at least one of the plurality of nodes is three dimensionally arranged at a position displaced from the correct position of the corresponding feature point, and the node feature value acquired from the projection point of projecting the error model onto the learning image in a learning image. Correlation information can be acquired by using methods such as canonical correlation analysis, linear regression, multiple linear regression, multiple non-linear regression, etc.

The error estimated amount acquiring means acquires the error estimated amount indicating the displacement between the position of each node of the current three dimensional model and the position of the corresponding feature point based on the information on the correlation stored in the storing means and the node feature value of each node acquired by the feature value acquiring means.

The estimating means estimates the three dimensional position of each feature point in the input image based on the error estimated amount obtained by the error estimated amount acquiring means and the position of each node of the current three dimensional model.

The second aspect of the present invention is a feature point detecting device for estimating a three dimensional arrangement of the feature point of the face in the input image using a three dimensional face shape model representing a three dimensional arrangement of a plurality of feature points in the face of the person. The feature point detecting device according to the second aspect of the present invention includes a model creating means, a projecting means, a feature value acquiring means, a storing means, an error estimated amount acquiring means, a changing means and an estimating means.

The model creating means creates a three dimensional face shape model representing the three dimensional arrangement of a plurality of features points in the face of the person.

The projecting means projects each node of the three dimensional face shape model created by the model creating means onto an input image plane.

The feature value acquiring means discretely acquires a plurality of feature values around the position of the projection point of each node of the three dimensional face shape model projected by the projecting means, and acquires the plurality of feature values acquired based on one projection point as one node feature value.

The storing means stores a transformation vector matrix, that is, an error estimation matrix acquired in advance through canonical correlation analysis. The inputs of the canonical correlation process are a set of vectors indicating the difference, in the position of each node, between a correct three dimensional face shape model and an error three dimensional face shape model and a set of node feature values obtained by projecting the error three dimensional face shape model onto a learning image. A correct three dimensional face shape model is a face shape model in which each node is arranged at a correct position. Similarly, an error three dimensional face shape model is a face shape model in which at least one of the nodes is arranged displaced from the correct position.

The error estimated amount acquiring means acquires the error estimated amount indicating the displacement between the current position of each node of the three dimensional face shape model and the position of the feature point of the face based on the error estimation matrix stored in the storing means and the set of node feature values acquired by the feature value acquiring means.

The changing means changes the position of each node of the current three dimensional face shape model based on the error estimated amount obtained by the error estimated amount acquiring means.

The estimating means estimates the position of each node after the position is changed by the changing means as the position of the feature point.

The first and second aspects of the invention may be realized by executing a program on an information processing device. That is, embodiments of the present invention may be a program that specifies processes executed according to each means or methods (in the first and second aspects above), the program being executed on an information processing device or a recording medium containing the relevant program. The information processing device herein includes a personal computer, digital camera, digital video camera, security camera, portable telephone equipped with the digital camera, digital video recorder, server that performs image processing (may be server connected to a network), digital photo printer, miniature laboratory equipment, etc.

DETAILED DESCRIPTION

Figure 1B:
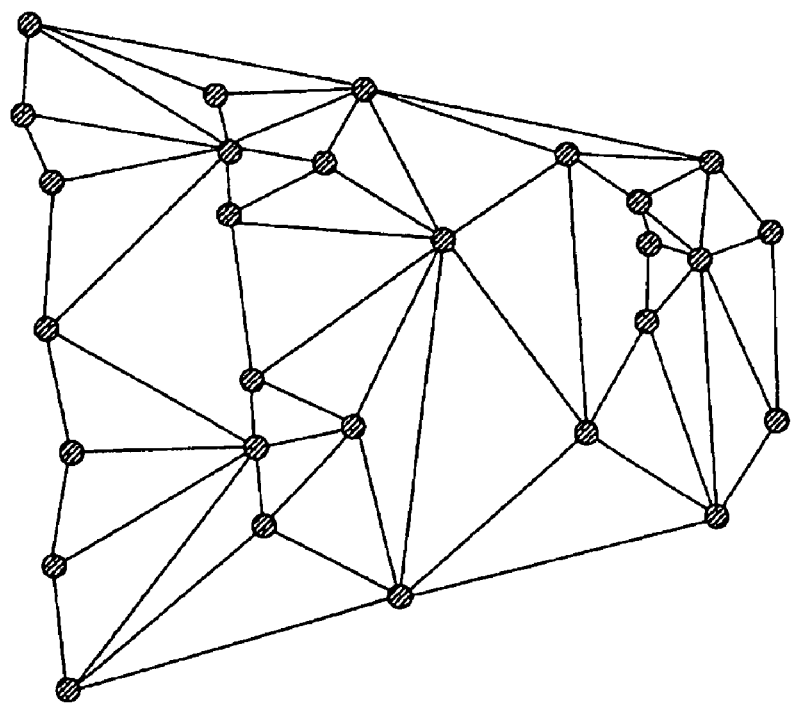
FIGS. 1A and 1B shows an example of feature points extracted from a face image.

The shape correcting process is conventionally performed as in AAM to generally perform error estimation (estimation of moving direction and moving amount to the correct point of each node in the shape model). Therefore, the omission of the shape correcting process has not been considered when performing error estimation. However, the required shape correcting process is assumed as one of the causes that increases the calculation amount in conventional AAM. Consequently, the inventors of the present invention thus considered a device for detecting the feature point without performing the shape correcting process.

Conventionally, a high density sampling is generally performed around each node to maintain high accuracy of error estimation. In conventional AAM, for example, homogeneous and high density samplings (normally ten thousand or more samplings) are required in the patch configured by each node. Therefore, low density sampling has not been considered when performing error estimation. Such homogeneous and high density sampling, however, is one of the causes that increases the calculation amount in the conventional AAM. Moreover, in AAM, the amount of movement and the amount of deformity of the face shape model are estimated based on linear regression by minute displacement around the correct point. Thus, accurate estimation cannot be performed for large displacements, and a correct result cannot be obtained. Therefore, detection of the feature point cannot be performed at high speed since a large amount of calculation is required during the search process, the shape correcting process of the luminance distribution by homogeneous and high density sampling, etc., in the processes using conventional ASM and AAM.

Furthermore, the position of the feature point is conventionally captured on the image plane (two dimensional). Therefore, the position of the feature point is determined on the image plane, and then the orientation of the object is estimated based on the relevant position of the feature point in order to obtain the orientation of the object (e.g., the face of person). Representing the shape model three dimensionally thus has not been considered. However, the orientation of the object can be directly obtained from the position of the detected feature points if the three dimensional model is used for the shape model.

As a result of such considerations, the inventors of the present invention came up with the following ideas. First, the sampling is performed in the patch configured by each node in the error estimation of the conventional AAM. Thus, if the result of the sampling is treated as a patch, it is difficult to maintain the accuracy of the process without performing the shape correcting process. However, when performing non-homogeneous and low density sampling for the plurality of points around each node, there is less likely to be an influence in deformation of the shape involved in the movement of the node since the points do not deform even if the shape deforms, and since the sampling points are at low density. Therefore, the accuracy of the process can thus be maintained without particularly performing the shape correcting process.

A feature point detecting device according to an embodiment of the present invention, for estimating a three dimensional position of a feature point of the human face will now be described with the object being the human face. In the following description, face image is an image including an image of at least one part of or the entire face of the person. Therefore, the face image may include an image of the entire person or may include an image of only the face or only the upper half of the body of the person. The face image may also include an image of a great number of people. Moreover, the face image may include various patterns including landscape, patterns, etc., other than the person in the background (background: include object given attention as a subject).

The inventors of the present invention have used a three dimensional shape model for a shape model in ASM and further combined feature value sampling by variable retina structure and an error estimation matrix learning by canonical correlation analysis to realize a high speed feature point detection. The feature point detection of high robustness is also realized by such combination. Moreover, the face orientation may even be estimated at the same as the detection of the feature point with such combination. The technique proposed by the inventors of the present invention will now be described.

First, a learning process necessary in detecting the feature points will be described. Next, a configuration example, an operation example, etc., of a feature point detecting device 1 (FIG. 6) for performing the feature point detection proposed by the inventors of the present invention will be described based on the result of the learning process. Subsequently, a variant that can be adopted in configuring the feature point detecting device 1 will be described.

<Learning Process>

The learning process necessary in operating the feature point detecting device 1 will be described first. The learning process is a process that must be performed in advance to detect the position of the feature points from the face image by the feature point detecting device 1. First, the processes necessary in describing the flow of the learning process, that is, acquisition of a three dimensional face shape model, projection of the three dimensional face shape model onto an image plane, retina sampling, and acquisition of error estimation matrix will be described. Thereafter, an example of a specific flow of the learning process will be described.

<Acquisition of a Three Dimensional Shape Model>

Figure 1A:
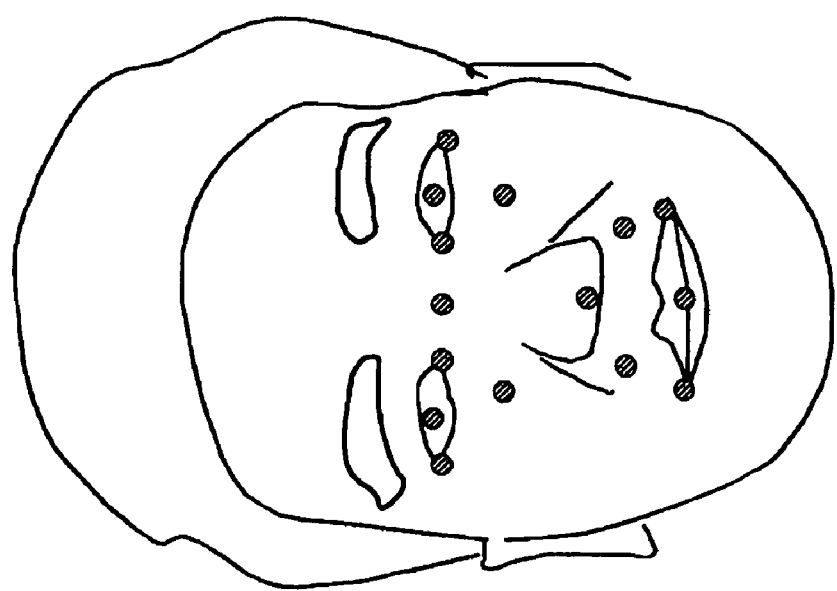

In the learning process, a plurality of learning face images (hereinafter referred to as "face image" in the description of the learning process) and three dimensional coordinates of the feature points in each face image are prepared. The feature point may be acquired by techniques such as a laser scanner, stereo camera, etc., but any other techniques may be used. The feature point extracting process is desirably performed by humans to enhance the accuracy of the learning process. FIG. 1A shows an example of feature points extracted from the face image. In FIG. 1A, the center position of a shaded circle becomes the feature point. Specifically, both ends (inner corner of the eye, tail of the eye) and the center portion of both eyes, left and right cheek bone portions (orbital floor portion), top of the nose, left and right corners of the mouth, center of the mouth, intermediate points of the left and right end points of the nose and the left and right corners of the mouth, etc., are the feature points. FIG. 1A has been illustrated as a plane view to describe the position of the feature points, but the feature points are actually extracted in a three dimensional coordinate as shown in FIG. 1B. The coordinate of each feature point pi is assumed as $pi(x_i, y_i, z_i)$. i is a value between 1 and n (n is the number of feature points).

A feature point arrangement vector X for each face image is defined as in equation 1. The feature point arrangement vector for a certain face image j is written as $X_j$. The number of dimensions of X is 3n.

$$X = [x_1, y_1, z_1, x_2, y_2, z_2, \ldots x_n, y_n, z_n]^T \qquad \text{[Equation 1]}$$

Next, all the acquired feature point arrangement vectors X are normalized based on an appropriate reference. The reference of normalization is appropriately determined by the designer. A specific example of normalization will be described below. If, for example, the barycentric coordinate of points p1 to $p_n$ is $p_G$ with regards to the feature point arrangement vector $X_j$ for a certain face image j, each point is moved to the coordinate system having the center of gravity $p_G$ as the origin, and the size thereof is normalized using $L_m$ defined by equation 2. Specifically, the size is normalized by dividing the coordinate value after movement by $L_m$. $L_m$ is an average value of a linear distance from the center of gravity to each point.

$$Lm = \frac{1}{n}\sum_{i=1}^{n} \sqrt{(x_i - x_G)^2 + (y_i - y_G)^2 + (z_i - z_G)^2} \qquad \text{[Equation 2]}$$

With respect to rotation, normalization is carried out by performing rotational transformation on the feature point coordinate so that the line connecting the centers of both eyes, for example, lie a certain direction. The above processes are represented by a combination of rotation and enlargement/reduction, and the feature point arrangement vector x after normalization is expressed as in equation 3 (similarity transformation).

$$x = sR_x R_y R_z X + t \qquad \text{[Equation 3]}$$

$$R_x = \begin{bmatrix} 1 & 0 & 0 \\ 0 & \cos\theta & -\sin\theta \\ 0 & \sin\theta & \cos\theta \end{bmatrix},$$

$$R_y = \begin{bmatrix} \cos\phi & 0 & \sin\phi \\ 0 & 1 & 0 \\ -\sin\phi & 0 & \cos\phi \end{bmatrix}, R_z = \begin{bmatrix} \cos\psi & -\sin\psi & 0 \\ \sin\psi & \cos\psi & 0 \\ 0 & 0 & 1 \end{bmatrix}$$

$$t = \begin{bmatrix} t_x \\ t_y \\ t_z \end{bmatrix}$$

The main component analysis is thereafter performed on the set of normalized feature point arrangement vectors. The main component analysis can be performed as below. First, an average vector (average vector is indicated with a horizontal line above x) is acquired according to the equation shown in equation 4. In equation 4, N indicates the number of face images, that is, the number of feature point arrangement vectors.

$$\bar{x} = \frac{1}{N} \sum_{j=1}^{N} x_j \qquad \text{[Equation 4]}$$

A differential vector x' is acquired by subtracting the average vector from all normalized feature point arrangement vectors, as shown in equation 5. The differential vector for image j is indicated as $x'_j$.

$$x'_j = x_j - \bar{x} \qquad \text{[Equation 5]}$$

3n sets of eigenvectors and eigenvalues are obtained as a result of the main component analysis. An arbitrary normalized feature point arrangement vector is expressed by an equation shown in equation 6.

$$x = \bar{x} + Pb \qquad \text{[Equation 6]}$$

P indicates the eigenvector matrix, and b indicates the shape parameter vector. The respective values are as shown in equation 7. $e_i$ indicates the eigenvector.

$$P = [e_1, e_2, \ldots, e_{3n}]^T$$

$$b = [b_1, b_2, \ldots, b_{3n}] \qquad \text{[Equation 7]}$$

The arbitrary normalized feature point arrangement vector x can be approximated and expressed as in equation 8 by using the values up to the high order $k^{th}$ dimension having a large eigenvalue. $e_i$ will be hereinafter referred to as the $i^{th}$ main component in the order of a large eigenvalue.

$$x = \bar{x} + P'b'$$

$$P' = [e_1, e_2, \ldots, e_k]^T$$

$$b' = [b_1, b_2, \ldots, b_k] \qquad \text{[Equation 8]}$$

In applying (fitting) the face shape model onto the actual face image, similarity transformation (parallel movement, rotation) is performed on the normalized feature point arrangement vector x. Assuming the parameters of similarity transformation as $s_x, s_y, s_z, s_\theta, s_\phi$, and $s_\psi$, a model parameter k can be expressed as in equation 9 in combination with the shape parameter.

$$k = [s_x, s_y, s_z, s_\theta, s_\phi, s_\psi, b_1, b_2, \ldots, b_k] \qquad \text{[Equation 9]}$$

If the three dimensional face shape model represented by the model parameter k more or less accurately matches the feature point positions on a certain face image, the relevant parameter is referred to as a three dimensional correct model parameter in the relevant face image. The determination on whether or not an accurate match is found is made based on a threshold value or a reference set by the designer.

<Projection Process>

The three dimensional shape model is processed on the two dimensional image by being projected onto the two dimensional plane. Various methods such as parallel projection method and perspective projection method are used as a method of projecting the three dimensional shape onto the two dimensional plane. An example of a single point perspective projection of the perspective projection methods will be described herein. Similar effects are obtained with any other methods. The single point perspective projection matrix on a z=0 plane is as shown in equation 10.

$$T = \begin{bmatrix} 1 & 0 & 0 & 0 \\ 0 & 1 & 0 & 0 \\ 0 & 0 & 0 & r \\ 0 & 0 & 0 & 1 \end{bmatrix} \qquad \text{[Equation 10]}$$

r=−1/z, and $z_c$ is the projection center on the z axis. The three dimensional coordinate [x, y, z] is thereby transformed as shown in equation 11, and is expressed as in equation 12 on the coordinate system of the z=0 plane.

$$[x \ y \ z \ 1] \begin{bmatrix} 1 & 0 & 0 & 0 \\ 0 & 1 & 0 & 0 \\ 0 & 0 & 0 & r \\ 0 & 0 & 0 & 1 \end{bmatrix} = [x \ y \ 0 \ rz+1] \qquad \text{[Equation 11]}$$

$$[x^* \ y^*] = \left[ \frac{x}{rz+1} \ \frac{y}{rz+1} \right] \qquad \text{[Equation 12]}$$

The three dimensional shape model is thus projected onto the two dimensional plane according to the above processes.

<Retina Sampling>

Figure 2:
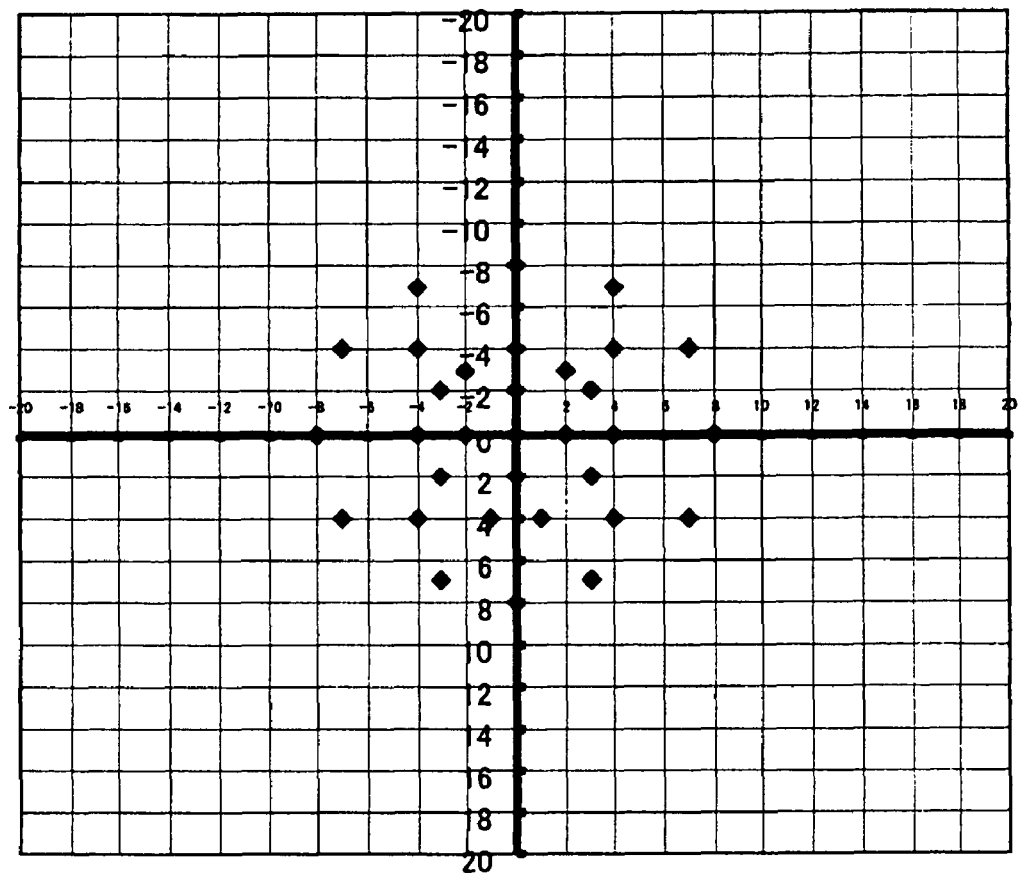
FIG. 2 shows an example of a retina structure.

Sampling of feature values will now be described. The sampling of feature values is carried out by combining a variable retina structure to the face shape model projected on the image. The retina structure is a structure of sampling points radially and discretely arranged around a certain feature point (node) of interest. FIG. 2 shows an example of the retina structure. In FIG. 2, the coordinate of the feature point of interest is the origin and each point positioned at other coordinates is the sampling point in the retina structure. The information around the feature point can be efficiently sampled at low dimension by performing sampling with retina structure. In the present learning process, sampling with retina structure is performed at the projection point (each point p) of each node of the face shape model (hereinafter referred to as two dimensional face shape model) projected onto the two dimensional plane from the three dimensional face shape model. Sampling with retina structure means performing sampling at sampling points defined according to the retina structure.

Figure 3:
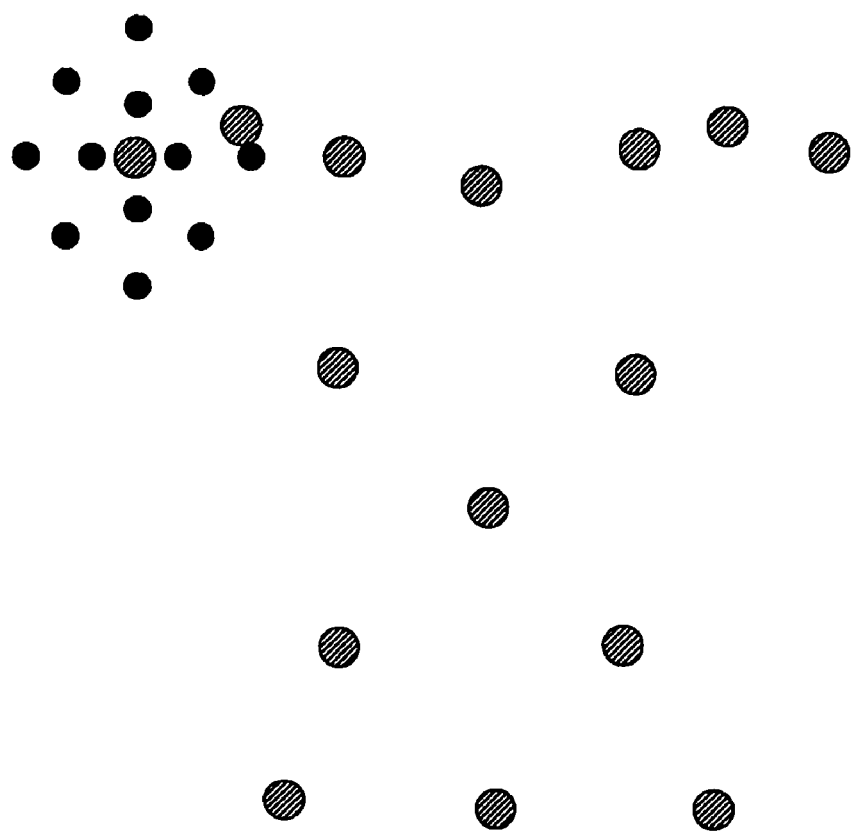
FIG. 3 shows a distribution example of sampling points when the retina structure is applied to a certain node of a face shape model.

FIG. 3 shows a distribution example of the sampling points when the retina structure is applied to a certain node of the two dimensional face shape model. In FIG. 3, the shaded circle indicates the node of the face shape model, and the black circle indicates the sampling point in the retina structure.

The retina structure is expressed as in equation 13 with the coordinate of the $i^{th}$ sampling point as $q_i(x_i, y_i)$.

$$r = [q_1^T, q_2^T, \ldots, q_m^T]^T \qquad \text{[Equation 13]}$$

Therefore, the retina feature value $f_p$ obtained by performing sampling with retina structure with respect to a certain point $p(x_p, y_p)$, etc. is expressed as in equation 14.

$$f_p = [f(p+q_1), \ldots, f(p+q_m)]^T \qquad \text{[Equation 14]}$$

f(p) indicates the feature value at point p (sampling point p). The luminance value of the pixel, the Sobel filter feature value, the Harr Wavelet feature value, the Gabor Wavelet feature value, and the composite value thereof are acquired at each sampling point in the retina structure as the feature value at the relevant sampling point. If the feature value is multi-dimensional, the retina feature value is expressed as in equation 15.

$$f_p = [f_1(p+q_1^{(1)}), \ldots f_D(p+q_1^{(D)}), \ldots f_1(p+q_m^{(1)}) \ldots ,$$
$$f_D(p+q_m^{(D)})]^T \qquad \text{[Equation 15]}$$

D indicates the number of dimensions of the feature value, and $f_d(p)$ indicates the feature value of the $d^{th}$ dimension at point p. Furthermore, $q_i(d)$ indicates the $i^{th}$ sampling coordinate of the retina structure with respect to the $d^{th}$ dimension.

The size of the retina structure can be changed according to the scale of the face shape model. For example, the size of the retina structure can be changed inversely proportionally to the parallel movement parameter $s_z$. The retina structure r for this case is expressed as in equation 16. α is an appropriate fixed value. The retina structure may be rotated or shape changed according to other parameters in the face shape model. The retina structure may also be set so that the shape (structure) differs among each node of the face shape model. The retina structure may be a structure with only the center point. That is, the retina structure may be the structure having only the feature point (node) as the sampling point.

$$r = \alpha s_z^{-1} [q_1^T, q_2^T, \ldots, q_m^T]^T \qquad \text{[Equation 16]}$$

In the three dimensional face shape model defined by certain model parameters, the sampling feature value f is defined as a vector in which the retina feature values obtained by performing sampling for every projection point of each node projected onto the projection plane are lined in one column. The sampling feature value f is expressed as in equation 17. In equation 17, n indicates the number of nodes in the face shape model.

$$f = [f_{p1}^T, f_{p2}^T, \ldots, f_{pn}^T]^T \qquad \text{[Equation 17]}$$

Normalization is performed at each node at the time of sampling. For example, normalization is carried out by performing a scale transformation so that the feature value is within the range of 0 to 1. Normalization may also be carried by performing transformation to obtain a constant average or variance. Normalization is sometimes not performed depending on the feature value.

<Acquisition of Error Estimation Matrix>

The acquisition of the error estimation matrix executed in the present learning process will now be described. The error estimation matrix is acquired using canonical correlation analysis. The canonical correlation analysis is one method of obtaining the correlation between two variates having different dimensions. Thus, the correlation learning result, that is, the direction to move each node when each node of the face shape model is arranged at the wrong position (a position different form the feature point to be detected), can be obtained using canonical correlation analysis.

Figure 4B:
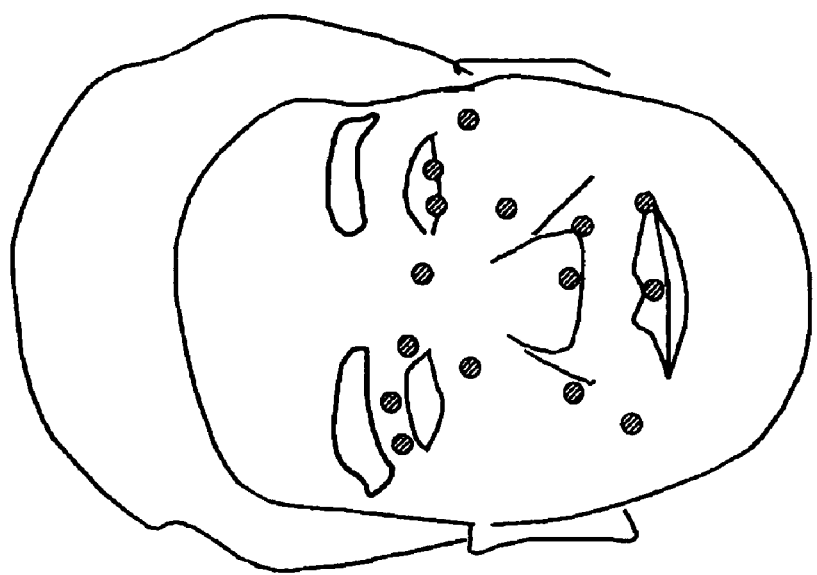
FIGS. 4A and 4B shows examples of a displaced arrangement model.
Figure 4A:
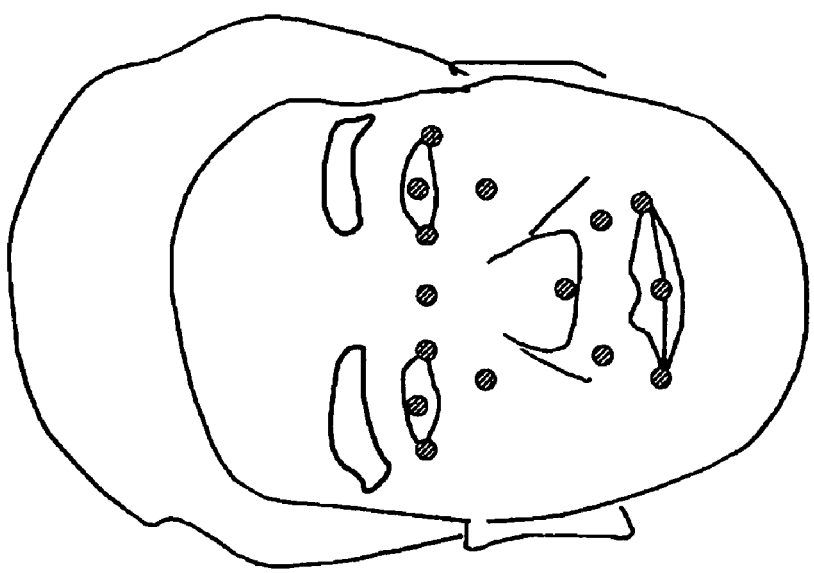

The three dimensional face shape model is created from the three dimensional position information of the feature point of the learning face image. Alternatively, the three dimensional face shape model is created from the two dimensional correct coordinate point of the learning face image. The correct model parameter is created from the three dimensional face shape model. A displaced arrangement model in which at least one of the nodes is displaced from the three dimensional position of the feature point is obtained by displacing the correct model parameter within a constant range by a random number etc. FIG. 4 shows a view of an example of the projection point of each node when the displaced arrangement model is projected onto the learning face image. In FIG. 4, the shaded circle indicates the position of the projection point. FIG. 4A shows the position of the projection point of each node obtained by projecting the correct model parameter in a certain face image onto the learning face image. FIG. 4B shows the position of the projection point of each node obtained by projecting the displaced arrangement model created by displacing the correct model (three dimensional face shape model represented by correct model parameter) shown in FIG. 4A onto the learning face image. The learning result regarding the correlation is obtained with the sampling feature value acquired based on the displaced arrangement model, and the difference between the displaced arrangement model and the correct model as a set. A specific process will be described below.

Two sets of variate vectors x and y are defined as in equation 18. x indicates the sampling feature value with respect to the displaced arrangement model. y indicates the difference between the correct model parameter ($k_{opt}$) and the displaced arrangement model parameter (parameter indicating displaced arrangement model: $k_{dif}$).

$$x = [x_1, x_2, \ldots, x_p]^T$$

$$y = [y_1, y_2, \ldots, y_q]^T = k_{opt} - k_{dif} \qquad \text{[Equation 18]}$$

Two sets of variate vectors are normalized in advance to average 0 and variance 1 with respect to each dimension. The parameters (average, variance of each dimension) used for normalization are necessary in the detection process of the feature point to be hereinafter described. The respective parameters $x_{ave}$, $x_{var}$, $y_{ave}$, $y_{var}$ are referred to as normalization parameters.

When the linear transformation with respect to two variates is defined as in equation 19, a and b that maximize the correlation between u and v are obtained.

$$u = a_1 x_1 + \ldots + a_p x_p = a^T x$$

$$v = b_1 y_1 + \ldots + b_q y_q = b^T y \qquad \text{[Equation 19]}$$

a and b are obtained as eigenvectors with respect to the maximum eigenvalue of when solving a general eigenvalue problem shown in equation 21 in consideration of simultaneous distribution of x and y and with the variance-covariance matrix Σ thereof defined as in equation 20.

$$\sum = \begin{bmatrix} \sum_{XX} & \sum_{XY} \\ \sum_{YX} & \sum_{YY} \end{bmatrix} \qquad \text{[Equation 20]}$$

$$(\Sigma_{XY} \Sigma_{YY}^{-1} \Sigma_{YX} - \lambda^2 \Sigma_{XX}) A = 0$$

$$(\Sigma_{YX} \Sigma_{XX}^{-1} \Sigma_{XY} - \lambda^2 \Sigma_{YY}) B = 0 \qquad \text{[Equation 21]}$$

Among them, the eigenvalue problem of lower dimension is solved first. If the maximum eigenvalue obtained by solving the first equation is $\lambda_1$ and the corresponding eigenvector is $a_1$, vector $b_1$ is obtained by the equation shown in equation 22.

$$b_1 = \frac{1}{\lambda_1} \sum\nolimits_{YY}^{-1} \sum\nolimits_{YX} a_1 \qquad \text{[Equation 22]}$$

$\lambda_1$ obtained in such manner is referred to as the first canonical correlation coefficient. $u_1$ and $v_1$ expressed by equation 23 are referred to as first canonical variate.

$$u_1 = a_1^T x$$

$$v_1 = b_1^T y \qquad \text{[Equation 23]}$$

This is sequentially obtained based on the size of the eigenvalue, such as the second canonical variate corresponding to the second largest eigenvalue, the third canonical variate corresponding to the third largest eigenvalue etc. The vector used in the detection process of the feature point (to be hereinafter described) is assumed to be a vector up to the $M^{th}$ canonical variate whose eigenvalue has a value (threshold value) greater than or equal to a constant. The threshold value may be appropriately determined by the designer. The transformation vector matrix up to the $M^{th}$ canonical variate is assumed as A' and B' and is called the error estimation matrix. A' and B' are expressed as in equation 24.

$$A'=[a_1,\ldots,a_M]$$

$$B'=[b_1,\ldots,b_M] \quad \text{[Equation 24]}$$

B' is generally not a square matrix. However, since an inverse matrix is necessary in the detection process of the feature point, zero vector is pseudo-added to B' thereby obtaining a square matrix B". The square matrix B" is expressed as in equation 25.

$$B''=[b_1,\ldots,b_M,0,\ldots,0] \quad \text{[Equation 25]}$$

The error estimation matrix may be obtained through analyzing methods such as linear regression, multiple linear regression, multiple non-linear regression or the like. However, the influence of the variate corresponding to a small eigenvalue may be ignored by using the canonical correlation analysis. Therefore, the effect of factors that do not influence the error estimation can be eliminated, thereby allowing a more stable error estimation. Thus, the error estimation matrix may be acquired using other analyzing methods mentioned above in place of the canonical correlation analysis if the relevant effects are not necessary. The error estimation matrix may also be acquired by methods such as SVM, RVM, etc.

<Flow of Learning Process>

Figure 5:
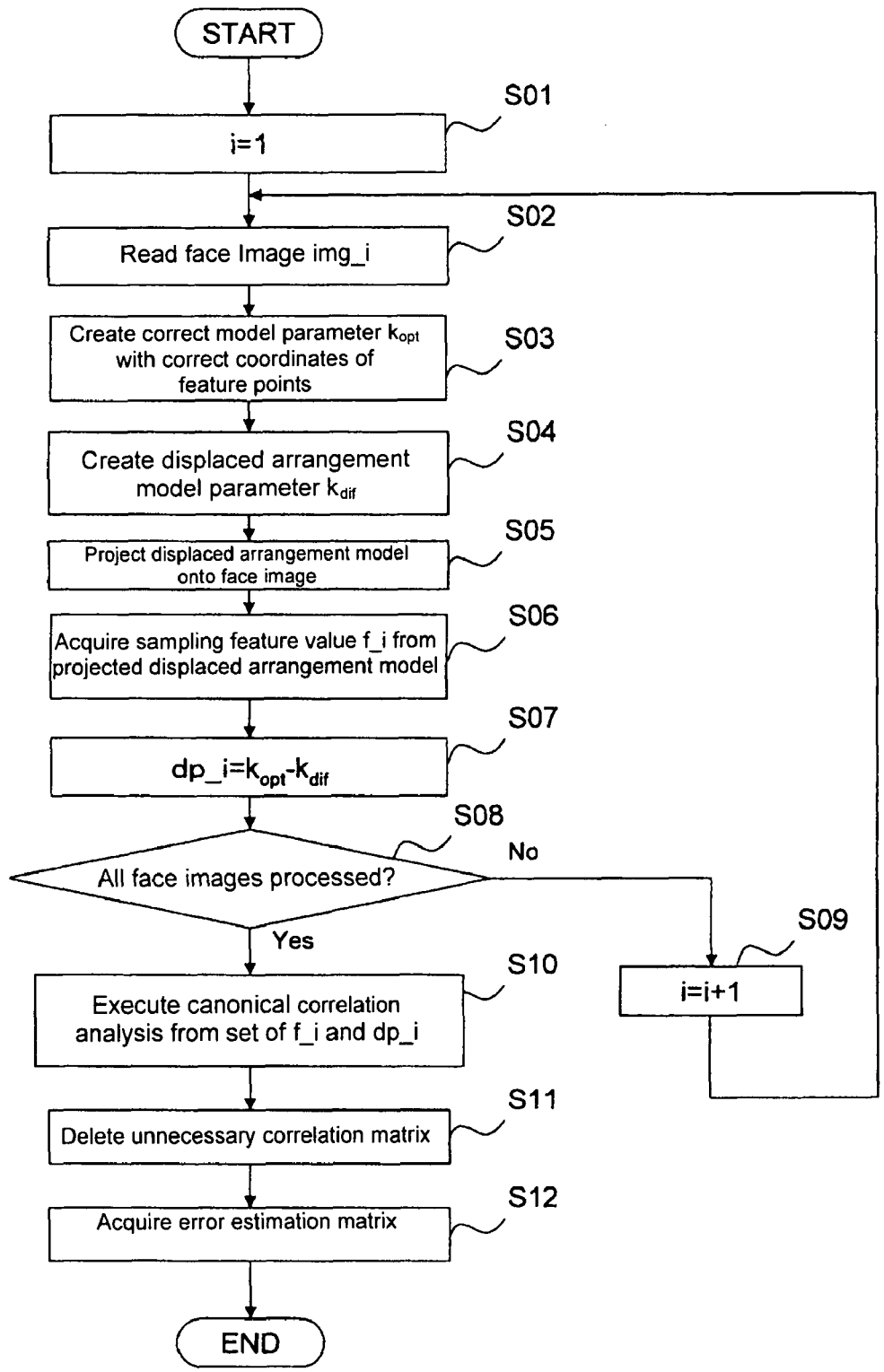
FIG. 5 shows a flowchart illustrating a processing example of a training process.

The three processes necessary for the present learning process, that is, the acquisition of the face shape model, the retina sampling, and the acquisition of the error estimation matrix have been described above. The flow of performing the learning process using such processes will now be described. FIG. 5 shows a flowchart illustrating an example of the flow of the learning process. The example of the flow of the learning process will now be described using FIG. 5. The processes described below are executed by an information processing device installed with a learning process program. The information processing device is configured to read, from the storage device connected thereto, the learning face image and the three dimensional coordinate position (correct coordinate of feature point) of each feature point extracted in advance in each face image. The information processing device may be configured to read data not only from the storage device but also through the network or by accessing a recording medium and like.

First, a variable i is defined and 1 is substituted (S01). The $i^{th}$ face image (Img_i) out of the learning face images which three dimensional position of the feature points are acquired in advance is then read (S02). The first face image (Img_1) is read in this case because 1 is substituted to i. The set of correct coordinates of the feature points of the face image Img_i is then read, and the correct model parameter $k_{opt}$ is acquired to create the three dimensional face shape model (correct model) (S03). The displaced arrangement model parameter $k_{dif}$ is then created based on the correct model parameter $k_{opt}$ to create the displaced arrangement model (S04). The displaced arrangement model is preferably created by producing random numbers and displacing each node in the correct model within a predetermined range. The displaced arrangement model is then projected onto the learning image (S05). Sampling using retina structure is then carried out based on the two dimensional shape model projected with the displaced arrangement model, and the sampling feature value f_i is acquired (S06). The error (displacement) dp_i of the shape model is acquired based on the correct model parameter $k_{opt}$ and the displaced arrangement model parameter $k_{dif}$ (S07). Determination is then made whether the processes are completed for all learning face images (S08). For example, determination can be made by comparing the value of i and n, which indicates the number of learning face images. If determined that non-processed face image exists (S08-No), the value of i is incremented (S09), and the processes after S02 are executed based on the new value of i. If determined that processes are completed for all face images (S08-Yes), the canonical correlation analysis is executed for the set of the sampling feature value f_i and the error dp_i of the shape model obtained for each face image (S10). The unnecessary correlation matrix corresponding to the eigenvalue smaller than the threshold value defined in advance is deleted (S11) and the error estimation matrix is ultimately acquired (S12).

Only one displaced arrangement model is created for each learning image in the above processes, but a plurality of displaced arrangement models may be created. In other words, the processes from S03 to S07 may be executed over a plurality of times (e.g., ten to hundred times) with respect to the learning image.

[Feature Point Detecting Device]

The feature point detecting device 1 (FIG. 6) will now be described. The feature point detecting device 1 detects feature points from the input face image based on the error estimation matrix obtained by the above learning processes, the normalization parameter, etc. The device configuration of the feature point detecting device 1 will now be described.

<Device Configuration>

The hardware of feature point detecting device 1 includes a CPU (Central Processing Unit), a main storage unit (RAM), an auxiliary storage unit, etc, connected by way of a bus in terms of hardware. In this case, the feature point detecting device 1 is realized by executing the program by the CPU. The auxiliary storage unit mentioned herein is configured using a non-volatile storage unit. The non-volatile storage unit is a so-called ROM (Read-Only Memory), EPROM (Erasable Programmable Read-Only Memory), EEPROM (Electrically Erasable Programmable Read-Only Memory), mask ROM etc.), FeRAM (Ferroelectric RAM), hard disk, etc.

Figure 6:
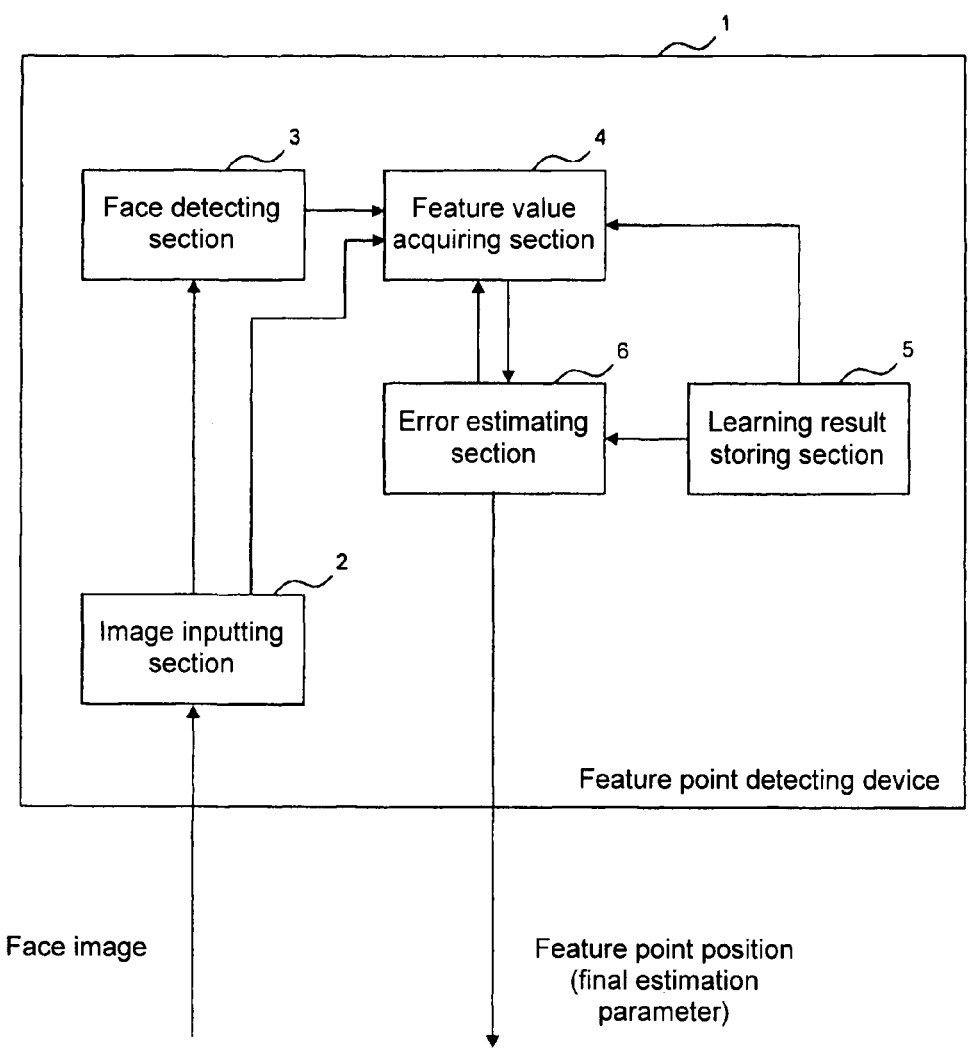
FIG. 6 shows an example of function blocks of a feature point detecting device.

FIG. 6 shows an example of function blocks of the feature point detecting device 1. The feature point detecting device 1 functions as a device including an image inputting section 2, a face detecting section 3, a feature value acquiring section 4, a learning result storing section 5, and an error estimating section 6, etc., by loading various programs (OS, application, etc.) stored in the auxiliary storage unit in to the main storage unit, and executing the programs by the CPU. The feature point detecting device 1 may be entirely or partially configured as a dedicated chip. Each function section arranged in the feature point detecting device 1 will now be described.

The image inputting section 2 functions as an interface for inputting the data of the face image into the feature point detecting device 1. The data of the face image is input to the feature point detecting device 1 by the image inputting section 2. The image inputting section 2 may be configured using any existing techniques for inputting the data of the face image to the feature point detecting device 1.

For example, the data of the face image may be input to the feature point detecting device 1 via the network (e.g., local area network, internet). In this case, the image inputting section 2 is configured using the network interface. The data of the face image may also be input to the feature point detecting device 1 from digital camera, scanner, personal computer, recording device (e.g., hard disc drive), etc. In this case, the image inputting section 2 is configured according to a standard (e.g., standards of wired connection such as USB (Universal Serial Bus), SCSI (Small Computer System Interface) etc., and wireless connection such as Bluetooth®, etc.) for data connecting the digital camera, the personal computer, the recording device, etc., and the feature point detecting device 1. Furthermore, the data of the face image recorded on the recording medium (e.g., various flash memories, Floppy® discs, CDs (Compact Disc), and DVD (Digital Versatile Disc, Digital Video Disc)) may be input to the feature point detecting device 1. In this case, the image inputting section 2 is configured using a device for reading the data from the recording medium (e.g., flash memory reader, Floppy® disc drive, CD drive, and DVD drive).

The feature point detecting device 1 may be interiorly arranged in an imaging device such as digital camera or in various devices (e.g., PDA (Personal Digital Assistant) and portable telephones) equipped with the imaging device, such as a digital camera, and the imaged image is input to the feature point detecting device 1 as data of the face image. In this case, the image inputting section 2 may be configured using a CCD (Charge-Coupled Device), CMOS (Complementary Metal-Oxide Semiconductor) sensor, etc., or may be configured as an interface for inputting the data of the face image imaged by CCD, CMOS sensor or the like to the feature point detecting device 1. Moreover, the feature point detecting device 1 may be interiorly arranged in an image output device such as a printer, display or the like, and the image input to the image output device as output data may be input to the feature point detecting device 1 as data of the face image. In this case, the image inputting section 2 is configured using a device for converting the data of the face image input to the image output device to the data capable of being handled in the feature point detecting device 1.

The image inputting section 2 may also be configured to respond to a plurality of the above cases.

The face detecting section 3 detects the face of a person from the face image input via the image inputting section 2. The face detecting section 3 may be configured to detect the face through template matching using a reference template corresponding to the contour of the entire face. The face detecting section 3 may also be configured to detect the face through template matching based on the constituting features (eye, nose, ear, etc.) of the face. The face detecting section 3 may further be configured to detect the vertex of the head, etc., by the Chromakey process to detect the face based on the vertex. The face detecting section 3 may also be configured to detect a region close to the color of the skin to detect the relevant region as the face. The face detecting section 3 may further be configured to perform learning by a teaching signal using neural network to detect the face-like region as the face. In addition, the face detection process of the face detecting section 3 may be realized by applying any other existing techniques.

The face detecting section 3 specifies the position of the detected face and sends the relevant position to the feature value acquiring section 4. In this case, the face detecting section 3 may be configured to acquire the tilt of the face or the size of the face, and send the value thereof to the feature value acquiring section 4.

The feature value acquiring section 4 acquires the sampling feature value from the image of the face of the person detected by the face detecting section 3. A specific process of the feature value acquiring section 4 will now be described.

The feature value acquiring section 4 first determines the three dimensional position of each node in the three dimensional face shape model and acquires the parameter (initial parameter) $k_{init}$ of the shape model when acquiring the sampling feature value for the first time with respect to the face detected by the face detecting section 3. The three dimensional shape model may be, for example, a shape in which the center of the detected face and the center of the three dimensional face shape model coincide. When a face square (square surrounding the detected face) is acquired by the face detecting section 3, the three dimensional shape model is a shape in which the predetermined nodes of the face shape model are arranged at predetermined positions from a certain vertex (e.g., upper left corner) of the face square. The three dimensional face shape model created by the feature value acquiring section 4 may be defined by the designer in various manners as long as the nodes are appropriately arranged with respect to the detected face. Each node is correlated to a feature point to be detected. The created three dimensional model is desirably a position at which the projection point of projecting each node of the three dimensional model on the input image is assumed to be close to the corresponding feature point of each node. Therefore, the initial position and the orientation of the three dimensional model created based on such reference are desirably defined in advance. For example, the center of the screen is assumed as the initial position and assumed as facing the front based on experiences that most objects are imaged facing the front at the center of the screen.

The initial parameter $k_{init}$ refers to the model parameter represented by the initial value out of the model parameters k expressed by equation 9. An appropriate value may be set for the initial parameter $k_{init}$. Various directions, change in expression, etc., of the face can be responded by setting an average value obtained from a general face image as the initial parameter $k_{init}$. Therefore, the average value of the correct model parameter of the face image used in the learning process may be used for the parameters $s_x$, $s_y$, $s_z$, $s_\theta$, $s_\phi$, and $s_\psi$, of the similarity transformation. For example, the shape parameter b may be zero. If the information on the direction of the face is obtained by the face detecting section 3, the initial parameter is set using such information. The designer may set other values obtained through experience as the initial parameter.

The feature value acquiring section 4 then projects the face shape model represented by the set initial parameter onto the input face image. The feature value acquiring section 4 then performs sampling based on the retina structure using the projected shape model, and acquires the sampling feature value f. The feature value acquiring section 4 sends the obtained sampling feature value f to the error estimating section 6.

If the feature value acquiring section 4 acquires the sampling feature value with respect to the face detected by the face detecting section 3 for the second or subsequent times, the sampling feature value f is obtained for the face shape model represented by a new model parameter k (i.e., estimated value $k_{i+1}$ of correct model parameter) obtained by the error estimating section 6. In this case as well, the feature value acquiring section 4 sends the obtained sampling feature value f to the error estimating section 6.

The learning result storing section 5, configured using a non-volatile storage unit, stores the learning result obtained through the learning processes described above. Specifically, the learning result storing section 5 stores the error estimation matrix, the normalization parameter, etc. The learning result storing section 5 may further store the initial parameter $k_{init}$ or some of the values (e.g., average value of similarity transformation parameter in correct model parameter of face image used in learning process etc.) constituting the initial parameter $k_{init}$, as necessary.

The error estimating section 6 estimates the error amount and acquires a new model parameter k based on the sampling feature value f acquired by the feature value acquiring section 4, and the error estimation matrix, the normalization parameter etc. stored in the learning result storing section 5. A specific processing example of the error estimating section 6 will now be described.

The error estimating section 6 first normalizes the sampling feature value f acquired by the feature value acquiring section 4 using the normalization parameters ($x_{ave}$, $x_{var}$), and acquires the vector x for performing the canonical correlation analysis. The error estimating section 6 acquires a variate u by calculating first to $M^{th}$ canonical variate based on the equation shown in equation 26.

$$u = [u_1, \ldots, u_M]^T = A'^T x \quad \text{[Equation 26]}$$

The error estimating section 6 then acquires the normalized error estimated amount y using the equation shown in equation 27. In equation 27, if B' is not a square matrix, $B'^{T-1}$ is a pseudo-inverse matrix of B'.

$$y = B''^{T-1} u' \quad \text{[Equation 27]}$$

The error estimating section 6 then performs a restoration process using the normalization parameter ($y_{ave}$, $y_{var}$) with respect to the normalized error estimated amount y to acquire the error estimated amount $k_{err}$. $k_{err}$ is the error estimated amount from the current model parameter $k_i$ to the correct model parameter $k_{opt}$. Therefore, the estimated value $k_{i+1}$ of the correct model parameter is acquired by adding the error estimated amount $k_{err}$ to the current model parameter $k_i$. However, there is the possibility that $k_{err}$ contains error. Therefore, in order to perform a more stable detection, the estimated value $k_{i+1}$ of the correct model parameter is acquired by the equation shown in equation 28. In equation 28, σ is an appropriate fixed value, and may be appropriately determined by the designer. Furthermore, σ may be changed according to the change in i.

$$k_{i+1} = k_i + \frac{k_{err}}{\sigma} \quad \text{[Equation 28]}$$

The error estimating section 6 approaches the estimated amount $k_i$ of the correct model parameter to the correct parameter by repeating sampling and error estimation. When performing such repetitive processes, the error estimating section 6 makes a determination on whether or not to end the process every time the estimated amount $k_i$ is obtained. For example, the error estimating section 6 may determine to end the process if the value of i exceeds a threshold value. The error estimating section 6 may also determine to end the process every time the value of Δk expressed by equation 29 becomes less than or equal to a threshold value. The error estimating section 6 may also determine whether or not to end the process based on whether or not the value of the acquired $k_{i+1}$ is within a normal range. For example, the error estimating section 6 may determine to end the process by outputting an error if the value of the acquired $k_{i+1}$ clearly does not indicate the correct position in the image of the face of the person. The error estimating section 6 may also determine to end the process by outputting an error when some of the nodes represented by the acquired $k_{i+1}$ are outside the image to be processed.

$$\Delta k = k_{i+1} - k_i \quad \text{[Equation 29]}$$

The error estimating section 6 sends the acquired estimated value $k_{i+1}$ of the correct model parameter to the feature value acquiring section 4 when determining to continue the process. When determining to end the process, the error estimating section 6 outputs the estimated value $k_i$ (or $k_{i+1}$) of the correct model parameter obtained at the relevant point in time as a final estimation parameter $k_{est}$.

OPERATION EXAMPLE

Figure 7:
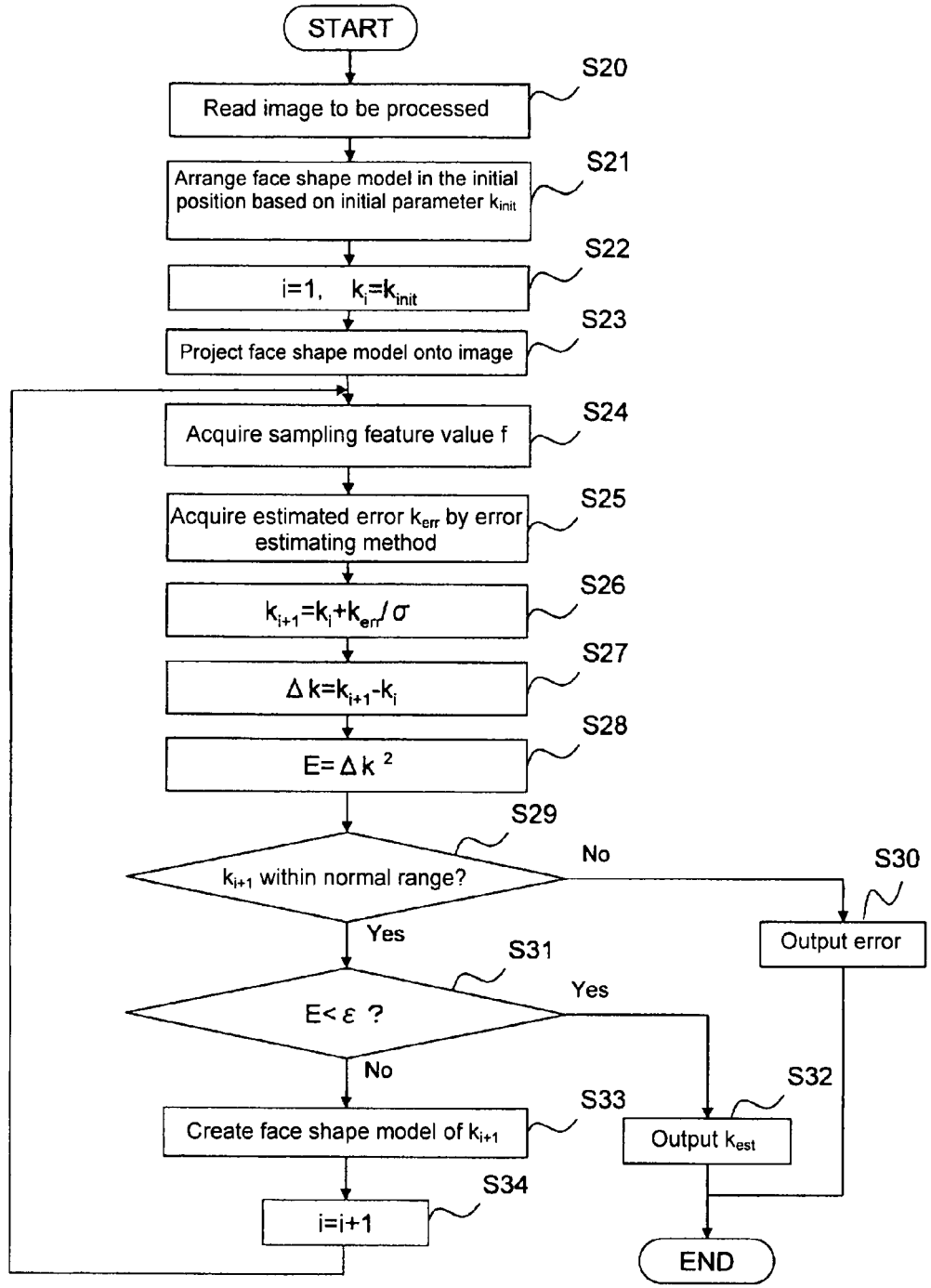
FIG. 7 shows a flowchart illustrating an operation example of the feature point detecting device.

FIG. 7 shows a flowchart illustrating an operational example of the feature point detecting device 1. An embodiment of feature point detecting device 1 will be described below by using FIG. 7. First, the feature point detecting device 1 reads the image to be processed through the image inputting section 2 (S20). The face detecting section 3 then detects the face of the target from the image to be processed. The feature value acquiring section 4 arranges the three dimensional face shape model, which is based on the initial parameter $k_{init}$, at the initial position obtained according to the result of the face detection process by the face detecting section 3 (S21). The feature value acquiring section 4 defines the variable i and substitutes 1. The feature value acquiring section 4 also defines $k_i$ and substitutes the initial parameter $k_{init}$ (S22). The feature value acquiring section 4 then projects the three dimensional face shape model represented by $k_i$ onto the image to be processed (S23). The feature value acquiring section 4 acquires the sampling feature value f according to the projected two dimensional shape model (S24).

The error estimating section 6 uses the acquired sampling feature value f, the error estimating method stored in the learning result storing section 5, etc., to acquire the estimated error $k_{err}$ between the three dimensional shape model $k_i$ and the correct model parameter. (S25). The error estimating section 6 calculates the estimated value $k_{i+1}$ of the correct model parameter based on the estimated error according to equation 28 (S26). The error estimating section 6 then calculates Δk as the difference between $k_{i+1}$ and $k_i$ (S27), and calculates E as the square of Δk (S28). The error estimating section 6 then determines whether or not to end the process.

In determining whether or not to end the process, the error estimating section 6 first determines whether or not $k_{i+1}$ is within a normal range (S29). If the value of $k_{i+1}$ is not within the normal range (S29-No), the error estimating section 6 outputs an error to the output device, etc. (not shown) (S30), and the feature point detecting device 1 ends the process. If the value of $k_{i+1}$ is within the normal range (S29-Yes), on the other hand, determination is made on whether or not the value of E acquired in the process of S28 is above the threshold value (ε) (S31). If E is not above the threshold value (S31-Yes), the error estimating section 6 assumes that the process is converging and outputs $k_{est}$ (S32), and the feature point detecting device 1 ends the process.

If E is above the threshold value (S31-No), the error estimating section 6 sends the value of $k_{i+1}$ to the feature value acquiring section 4. The feature value acquiring section 4 then creates a new three dimensional face shape model based on the value of $k_{i+1}$ (S33). The error estimating section 6 then increments the value of i (S34). The feature value acquiring section 4 projects the new three dimensional face shape model onto the image to be processed, and performs acquisition of the sampling feature value f etc. That is, the processes after S23 are repeated based on the new three dimensional face shape model.

(Effects)

In conventional ASM, the search process must be repeated around each node of the face shape model. Furthermore, in conventional AAM, homogeneous and high density sampling must be performed in the patch configured by each node, and the shape correcting process must be performed on the result thereof. Specifically, ten thousand or more samplings are usually required in conventional AAM. That is, the amount of calculation cannot be sufficiently reduced in conventional techniques regardless of the demands for processing speed and response in the detection process of the feature points.

Firstly, the shape correcting process is optional in the feature point detecting device 1. Furthermore, the detection process of the feature point is performed by non-homogeneous and low density sampling based on retina structure in the feature point detecting device 1. Specifically, the detection process usually becomes possible at about a few hundred samplings. Secondly, the searching process does not need to be performed around each node, and high density sampling serving as a plane does not need to be performed in a patch configured by each node. According to feature point detecting device 1, the amount of calculation required in detecting the feature point is thus greatly reduced compared to the prior art. Furthermore, the amount of data to be saved as learning result is reduced since the sampling the number of points is reduced.

In the feature point detecting device 1, the influence of excess factors, which become the cause of prediction error, can be eliminated in advance since the error estimation matrix is obtained through canonical correlation analysis. Furthermore, the error estimating process can be performed at high speed since error estimation is performed only through linear calculation.

Stable feature point detection is performed even if some of the feature points are hidden in the face image to be processed or the size greatly differs from the face of the learning image since the feature point detecting device 1 searches for the feature point using the face shape model. Stable results of more satisfactory accuracy are obtained since the three dimensional face shape model is used as the face shape model.

The face orientation of the (direction and angle the face is facing) can be directly obtained from the detection process or the detection result since the three dimensional face shape model is used. In other words, the orientation of the face can be obtained from the parameters $s_\theta$, $s_\phi$, and $s_\psi$ in the face shape model parameter output by the feature point detecting device 1.

MODIFICATION EXAMPLE

After the error regarding the orientation of the three dimensional model becomes less than or equal to a predetermined threshold value, the relative position of each current node may be changed based on the error estimated amount to create the new three dimensional model. According to such configuration, it is possible to perform feature point detection that is robust with respect to change in direction of the object that appears in the input image.

The face detecting module may be configured to further detect the direction of the face of the person. In this case, the model creating module includes a three dimensional node model in which the three dimensional position of each node is defined, and may be configured to deform the three dimensional node model based on the direction of the face detected by the face detecting module and use the same. For example, the model creating module rotates each node of the three dimensional node model to match the face facing left when the direction of the face is detected as facing left by the face detecting module. The model creating module may be configured to perform the above-mentioned rotation process for a given direction when a face facing another direction is detected. According to such configuration, the position of each feature point is more accurately detected in comparison to using a non-deforming three dimensional node model prepared in advance.

The face detecting module may be configured to further detect the size of the face of the person. In this case, the model creating module includes a three dimensional node model in which the three dimensional position of each node in the three dimensional model is defined, and may be configured to deform the three dimensional node model based on the size of the face detected by the face detecting module and use the same. For example, the model creating module may be configured to enlarge or reduce the three dimensional node model based on the size of the face detected by the face detecting module and use the same. According to such configuration, the position of each feature point is more accurately detected compared to using a non-deforming three dimensional node model prepared in advance.

The face detecting module may be configured to further detect the direction of the face of the person. In this case, the model creating module may be configured to include a plurality of three dimensional models in which the three dimensional position of each node in a given three dimensional model is defined according to the direction of the face. For example, the model creating module may be configured to include three dimensional node models corresponding to each of the face facing right, the face facing front, the face facing left, the face facing up, and the face facing down. The storing module may also be configured to store information on the correlation corresponding to each three dimensional node model obtained in advance using the learning image in which the face facing the corresponding direction is imaged. Furthermore, the model creating module may be configured to select the three dimensional node model to use based on the direction of the face detected by the face detecting module. The error estimated amount acquiring module may be configured to read the information on the correlation corresponding to the three dimensional node model selected by the model creating module from the storing module and use the same.

In the first aspect of the present invention configured as above, the feature point detection is performed using the three dimensional node model specialized for the direction of the face detected by the face detecting module and the information on the correlation corresponding to the relevant three dimensional node model.

The face detecting module may be configured to further detect the size of the face of the person. In this case, the model creating module may be configured to include a plurality of three dimensional models in which the three dimensional position of each node in the three dimensional model is defined according to the size of the face. The storing module may be configured to store information on the correlation corresponding to each three dimensional node model obtained in advance using the learning image in which the face of the corresponding size is imaged. Furthermore, the model creating module may be configured to select the three dimensional node model to use based on the size of the face detected by the face detecting module. The error estimated amount acquiring module may be configured to read the information on the correlation corresponding to the three dimensional node model selected by the model creating module from the storing module and use the same.

The sampling points at which the feature value acquiring module acquires the node feature value may be discretely arranged around the projection point of the node. The sampling points at which the feature value acquiring module acquires the node feature value in may be configured to be denser towards the projection point of the node and be less dense away from the projection point of the node. The sampling points at which the feature value acquiring module acquires the node feature value may be configured to include a retina structure. The feature value acquiring module in may be configured to store a plurality of different retina structures, and determine the plurality of sampling points according to the retina structure corresponding to the projection point of each node.

The learning result storing section 5 may store in advance the initial parameter $k_{init}$ indicating the state of the plurality of faces. For example, the learning result storing section 5 may store the value of the initial parameter knit corresponding to the face facing the side, the face facing up, etc. The feature value acquiring section 4 may change the face shape model to use depending on the value of the acquired $k_{i+1}$. For example, the range of the face shape models covered by each initial parameter is first defined in advance. If the value of $k_{i+1}$ newly acquired by the error estimating section 6 is deviates from the range (of face shape models) covered by the initial parameter used, the feature value acquiring section 4 may be configured to discard the value of $k_{i+1}$, read an initial parameter different from the initial parameter $k_{init}$ from the learning result storing section 5 and re-execute the processes after S21 based on the newly read value of the initial parameter.

The feature value acquiring section 4 may change the face shape model to use in the detection process with respect to the face image input next according to the value of $k_{i+1}$ obtained at a certain point in time if the detection process of the feature point is repeatedly executed. If the face contained in the image to be processed is facing the side, results of higher precision are obtained by performing the process using the initial parameter indicating the face shape model of the face facing the side rather than continuing the process using the model represented by $k_{i+1}$. Therefore, in such case, it is effective to configure the feature value acquiring section 4 according to the above modification.

According to such configuration, greater changes in face orientation can be addressed.

The feature value acquiring section 4 may be configured to switch the retina structure, the error estimation matrix, etc., instead of the initial parameter $k_{init}$. For example, consideration is made in performing the initial correct model parameter estimation with the face parameter fixed and having only the parameter of movement/rotation changed, and performing the process of estimating the shape parameter after the movement/rotation parameter is more or less determined. In other words, in the initial model parameter estimation, the model parameter is approached to the correct parameter using the parameters $s_x$, $s_y$, $s_z$, $s_\theta$, $s_\phi$, and $s_\psi$ related to the movement and rotation taken from the error estimated amount $k_{err}$. After the parameters related to movement and rotation converge, the model parameter is approached to the correct parameter using the shape parameters $b_1$, $b_2$, . . . , $b_k$ from the error estimated amount $k_{err}$. According to such configuration, feature point detection and face orientation estimation, which are more robust to the change in the direction of the face, become possible. The processing speed increases since the number of dimensions of the parameter to be used all at once is reduced.

A configuration for increasing the change in shape parameter according to the number of repetitive processes may also be adopted.

The error estimating section 6 does not need to determine whether or not to end the process and may simply output the value of $k_{i+1}$ obtained at the relevant point in time as $k_{est}$.

The feature point detecting device 1 may be configured without the face detecting section 3. In this case, the feature value acquiring section 4 is configured to perform the process with the center of the screen as the initial position. Alternatively, the face detecting section 3 may be arranged exterior to the feature point detecting device 1, and the position information of the detected face may be input with the face image to the feature point detecting device 1.

The face detecting section 3 may be configured to detect the eye, the mouth or other feature points of the person instead of the face itself. In this case, the feature value acquiring section 4 is configured to determine the initial value based on the position of such feature point.

The feature value acquiring section 4 may arrange the sampling points based on structures other than the retina structure. For example, the feature value acquiring section 4 may acquire the feature value from a plurality of points discretely arranged around the projection point of the node.

The feature point detecting device 1 has been described to estimate the position of the feature point of the face of the person, with the object being the face of the person, but the object may be other than the face of the person. For example, the feature point detecting device 1 may estimate the position of the feature point with the object being objects having individual difference in size such as a whole (whole body of) person, organs, etc., in X-ray image or CT image, or objects that deform without changing the basic shape thereof. The feature point detecting device 1 may also estimate the position of the feature point for rigid bodies that do not deform such as industrial products including automobiles, etc., since the shape model may be set with respect to the rigid body.

A higher speed and more accurate feature point detection device and/or process can be realized if implemented according to any of the above-mentioned embodiments of the invention.

What is claimed is:

1. A feature point detecting device implemented by executing a program stored on a non-transitory computer readable medium, the device for estimating a three dimensional position of a plurality of feature points in an image of a predetermined object from an input image, the device comprising:

a model creating module for creating a three dimensional model in which three dimensional positions of a plurality of nodes each corresponding to the plurality of feature points are defined;

a projecting module for projecting each node defined by the three dimensional model onto the image;

a feature value acquiring module for acquiring a feature value from a plurality of sampling points around a projection point of each node projected by the projecting module as a node feature value of each node of the three dimensional model;

a storing module for storing in advance information on a correlation of a difference between a correct model, in which the plurality of nodes are each three dimensionally arranged at correct positions of the corresponding feature points, and an error model, in which at least one of the plurality of nodes is three dimensionally arranged at a position displaced from the correct position of the corresponding feature point, and the node feature value acquired from the projection point of projecting the error model onto a learning image;

an error estimated amount acquiring module for acquiring an error estimated amount indicating the displacement of the position of the corresponding feature point from the three dimensional model based on the information on the correlation stored in the storing module and the node feature value of each node acquired by the feature value acquiring module; and an estimating module for estimating the three dimensional position of each feature point in the input image based on the error estimated amount obtained by the error estimated amount acquiring module and the three dimensional model.

2. A feature point detecting device according to claim 1, further comprising an end determining module for determining an end of a repetitive process, wherein the model creating module moves the position of each node based on the error estimated amount and creates a new three dimensional model if the error estimated amount is obtained;

the model creating module and the error estimated amount acquiring module repeatedly execute the processes; and the estimating module estimates the three dimensional position of each feature point in the input image based on the error estimated amount at the point the end the determining module determines to end the process and the three dimensional model at the end.

3. A feature point detecting device according to claim 2, wherein the end determining module determines to end the repetitive process when the error estimated amount obtained by the error estimated amount acquiring module is less than or equal to a threshold value.

4. A feature point detecting device according to claim 2 or claim 3, wherein the model creating module:

creates a new three dimensional model by performing movement and/or rotation while maintaining a current relative positional relationship of each node to change an orientation based on the error estimated amount in an initial stage of the repetitive process; and creates a new three dimensional model by changing a current relative position of each node based on the error estimated amount after the error related to the orientation of the three dimensional model becomes less than or equal to the predetermined threshold value.

5. A feature point detecting device according to claim 1, wherein the object is a face of a person.

6. A feature point detecting device according to claim 5, further comprising:

a face detecting module for detecting at least a position of the face of the person or an element of the face of the person from the input image; wherein, an arrangement module determines the three dimensional position of each node in the three dimensional model based on the detected position of the face of the person or the element of the face of the person.

7. A feature point detecting device according to claim 6, wherein, the face detecting module further detects a direction of the face of the person;

the model creating module includes a three dimensional node model in which the three dimensional position of each node in the three dimensional model is defined and deforms the three dimensional node model based on the direction of the face detected by the face detecting module.

8. A feature point detecting device according to claim 6, wherein, the face detecting module further detects a size of the face of the person;

the model creating module includes a three dimensional node model in which the three dimensional position of each node in the three dimensional model is defined, and deforms the three dimensional node model based on the size of the face detected by the face detecting module.

9. A feature point detecting device according to claim 6, wherein:

the face detecting module further detects a direction of the face of the person;

the model creating module includes a plurality of three dimensional node models in which the three dimensional position of each node in the three dimensional model is defined according to the direction of the face, the storing module stores the information on the correlation corresponding to each three dimensional node model obtained in advance using the learning image in which the face facing of the corresponding direction is imaged;

the model creating module selects the three dimensional node model to use based on the direction of the face detected by the face detecting module; and the error estimated amount acquiring module reads the information on the correlation corresponding to the three dimensional node model selected by the model creating module from the storing module and uses the information.

10. A feature point detecting device according to claim 6, wherein, the face detecting module further detects a size of the face of the person;

the model creating module includes a plurality of three dimensional node models in which the three dimensional position of each node in the three dimensional model is defined according to the size of the face;

the storing module stores the information on the correlation corresponding to each three dimensional node model obtained in advance using the learning image in which the face of the corresponding size is imaged;

the model creating module selects the three dimensional node model to use based on the size of the face detected by the face detecting module; and the error estimated amount acquiring module reads the information on the correlation corresponding to the three dimensional node model selected by the model creating module from the storing module and uses the information.

11. A feature point detecting device according to claim 1, wherein the plurality of sampling points are discretely arranged around the projection point of the node.

12. A feature point detecting device implemented by executing a program stored on a non-transitory computer readable medium, the device for estimating a three dimensional position of a feature point in an input image using a three dimensional face shape model representing the three dimensional arrangement of a plurality of feature points in a face of a person, wherein the device comprises:

a model creating module for creating the three dimensional face shape model;

a projecting module for projecting each node of the three dimensional face shape model created by the model creating module onto an input image plane;

a feature value acquiring module for discretely acquiring a plurality of feature values around the position of the projection point of each node projected by the projecting module and acquiring the plurality of feature values acquired based on one projection point as one node feature value;

a storing module for storing a transformation vector matrix acquired in advance through a canonical correlation analysis, which uses as input a set of vectors, which indicate a difference in position of each node between a correct three dimensional face shape model and an error three dimensional face shape model and a set of the node feature values acquired from the projection points of projecting the error three dimensional face shape model, on a learning image, as an error estimation matrix;

wherein each node in the three dimensional face shape model is arranged at a correct position and at least one of the nodes in the error three dimensional shape face model displaced from the correct position;

an error estimated amount acquiring module for acquiring an error estimated amount, which indicates the displacement between a current position of each node of the three dimensional face shape model and the position of the feature point of the face based on the error estimation matrix stored in the storing module, and the set of node feature values acquired by the feature value acquiring module;

a changing module for changing the position of each node of the current three dimensional face shape model based on the error estimated amount obtained by the error estimated amount acquiring module; and an estimating module for estimating the position of each node after the position is changed by the changing module as the three dimensional position of the feature point.

13. A feature point detecting method for estimating a three dimensional position of a plurality of feature points in an image of a predetermined object from an input image, wherein an information processing device executes the steps of:

creating a three dimensional model in which three dimensional positions of a plurality of nodes each corresponding to the plurality of feature points are defined;

projecting each node defined by the three dimensional model onto the image;

acquiring a feature value from a plurality of sampling points around a projection point of each node projected by the projecting module as a node feature value of each node of the three dimensional model;

acquiring an error estimated amount, which indicates the displacement of the position of the corresponding feature point from a current three dimensional model based on information on a correlation of a difference between a correct model in which the plurality of nodes are each three dimensionally arranged at correct positions of the corresponding feature points and an error model in which at least one of the plurality of nodes is three dimensionally arranged at a position displaced from the correct position of the corresponding feature point, and the node feature value acquired from the projection point of projecting the error model onto a learning image, acquired in advance based on the learning image, and the node feature value of each node acquired in the step of acquiring the feature value; and estimating the three dimensional position of each feature point in the input image based on the error estimated amount and the current three dimensional model.

14. A non-transitory computer readable medium storing a program, which, when executed causes an information processing device to estimate a three dimensional position of a plurality of feature points in an image of a predetermined object from an input image, wherein the information processing device executes the steps of:

creating a three dimensional model in which three dimensional positions of a plurality of nodes each corresponding to the plurality of feature points are defined;

projecting each node defined by the three dimensional model onto the image;

acquiring a feature value from a plurality of sampling points around a projection point of each node projected by the projecting module as a node feature value of each node of the three dimensional model;

acquiring an error estimated amount, which indicates the displacement of the position of the corresponding feature point from the current three dimensional model based on information on a correlation of a difference between a correct model in which the plurality of nodes are each three dimensionally arranged at correct positions of the corresponding feature points and an error model in which at least one of the plurality of nodes is three dimensionally arranged at a position displaced from the correct position of the corresponding feature point, and the node feature value acquired from the projection point of projecting the error model onto a learning image, acquired in advance based on the learning image, and the node feature value of each node acquired in the step of acquiring the feature value; and estimating the three dimensional position of each feature point in the input image based on the error estimated amount and the current three dimensional model.

15. A feature point detecting method for estimating a three dimensional position of a feature point of a face in an input image using a three dimensional face shape model representing a three dimensional arrangement of a plurality of feature points in a face of a person, wherein an information processing device executes the steps of:

creating the three dimensional face shape model;

projecting each node of the created three dimensional face shape model onto an input image plane;

discretely acquiring a plurality of feature values around the projection point of each projected node and acquiring the plurality of feature values acquired based on one projection point as one node feature value;

acquiring an error estimated amount, which indicates the displacement between a current position of each node of the three dimensional face shape model and the position of the feature point of the face based on a transformation vector matrix acquired in advance through a canonical correlation analysis, which takes as input a set of vectors indicating the difference in position of each node between a correct three dimensional face shape model in which each node is arranged at a correct position and an error three dimensional face shape model in which at least one of the nodes is arranged displaced from the correct position and a set of node feature values acquired from the projection point of projecting the error three dimensional face shape model onto a learning image, acquired in advance based on the learning image, and a set of node feature values acquired in the step of acquiring the feature values;

changing the position of each node of the current three dimensional face shape model based on the acquired error estimated amount; and estimating the position of each node after the position is changed as the three dimensional position of the feature point.

16. A non-transitory computer readable medium storing a program, which, when executed causes for an information processing device to estimate a three dimensional position of a feature point of a face in an input image using a three dimensional face shape model representing a three dimensional arrangement of a plurality of feature points in a face of a person, wherein an information processing device executes the steps of:

creating the three dimensional face shape model;

projecting each node of the created three dimensional face shape model onto an input image plane;

discretely acquiring a plurality of feature values around the projection point of each projected node, and acquiring the plurality of feature values acquired based on one projection point as one node feature value;

acquiring an error estimated amount indicating the displacement between a current position of each node of the three dimensional face shape model and the position of the feature point of the face based on a transformation vector matrix acquired in advance through a canonical correlation analysis, which takes as input a set of vectors indicating the difference in position of each node between a correct three dimensional face shape model in which each node is arranged at a correct position and an error three dimensional face shape model in which at least one of the nodes is arranged displaced from the correct position and a set of node feature values acquired from the projection point of projecting the error three dimensional face shape model onto a learning image, acquired in advance based on the learning image, and a set of node feature values acquired in the step of acquiring the feature values;

changing the position of each node of the current three dimensional face shape model based on the acquired error estimated amount; and estimating the position of each node after the position is changed as the three dimensional position of the feature point.

\* \* \* \* \*